J. C. MILLIGAN.
Dust-Pan.
No. 218,997. Patented Aug. 26, 1879.
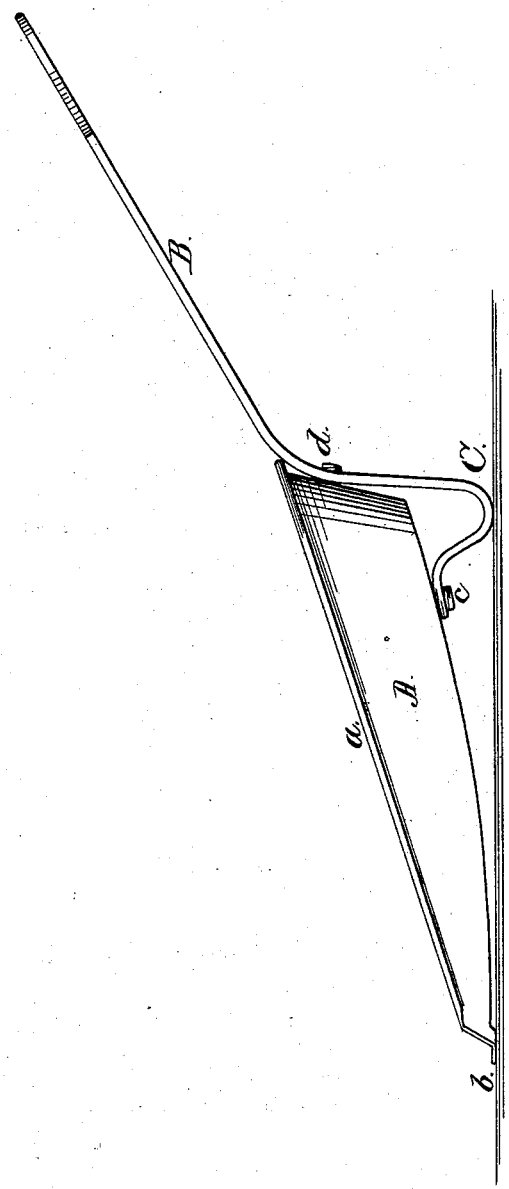
Witnesses:
F. W. Howard
R. N. Dyer.
Inventor:
John C. Milligan
By Atty Wm Crew McIntire

UNITED STATES PATENT OFFICE.

JOHN C. MILLIGAN, OF SOUTH ORANGE, N. J., ASSIGNOR TO LALANCE & GROSJEAN MANUFACTURING COMPANY, OF NEW YORK.

IMPROVEMENT IN DUST-PANS.

Specification forming part of Letters Patent No. 218,997, dated August 26, 1879; application filed July 31, 1879.

*To all whom it may concern:*

Be it known that I, JOHN C. MILLIGAN, of South Orange, in the county of Essex and State of New Jersey, have invented certain new and useful Improvements in Dust-Pans; and I do hereby declare that the following is a full and exact description thereof, reference being had to the accompanying drawing, making a part of this specification.

My invention relates to certain improvements in dust-pans.

It has for its objects to produce a simple and economic structure, which shall be capable of maintaining itself in proper position on the floor to receive the sweepings; and consists of an ordinary pan struck up from, preferably, a single sheet of tin, or other suitable metal, with its edges turned over, and its body fluted or embossed to give it the requisite strength, having its front end formed with a dust-gathering lip, and provided at its rear with a handle formed of sheet metal so bent and secured as to form a rigid handle and elevating prop or foot, as will be hereinafter more fully set forth.

It has been common, prior to my invention, to provide dust-pans with some sort of device for elevating the rear portion, so as to form a proper angle between the front edge and the floor, to facilitate the entrance of the sweepings to the pan and avoid the necessity of elevating the pan by hand. This has been accomplished in some instances by providing the rear portion of the bottom of the pan with an elevating cross-piece independent of the pan proper, and in other instances the same result has been accomplished by forming the bottom of the pan itself in such manner that when placed upon the floor its front edge would be held at the proper angle; but in all the structures with which I am familiar the result is accomplished with considerable expense or complexity in manufacture, while my invention is very simple in construction and exceedingly economic, and possessing the still further merit of being adaptable to all dust-pans as at present made.

In order that those skilled may fully understand my invention, I will describe its construction and operation, referring by letters to the accompanying drawing, which represents a side elevation of a dust-pan embodying my invention.

A represents the pan proper, which is preferably formed from a single piece of sheet metal. The upper edges, $a$, are turned over to strengthen and stiffen the pan, and the front edge is fashioned with a lip, $b$.

B is the handle, which is made of a single piece of sheet metal strengthened by embossing or fluting, and its upper end provided with a suitable hole by which the pan may be hung up. The other end of the handle is bent, as shown, to form a prop or foot, C, and is connected to the bottom and back of the pan at $c\ d$ by suitable rivets, the fastening at these two points rendering the foot C perfectly rigid and strong.

It will be readily understood that my improved handle may be readily adapted and applied to dust-pans as at present made.

What I claim as new, and desire to secure by Letters Patent, is—

1. In combination with the pan A, the handle B, one end of which is bent to form a prop, and secured to the bottom and back of the pan, substantially as hereinbefore set forth.

2. A handle for dust-pans, composed of a single piece of metal bent to form a prop, and adapted to be secured to a pan, in the manner described.

In testimony whereof I have hereunto set my hand.

JOHN C. MILLIGAN.

In presence of—
   E. W. MARTIN,
   JAMES COCHRAN.